(12) United States Patent  
Imai et al.

(10) Patent No.: US 10,845,809 B2  
(45) Date of Patent: Nov. 24, 2020

(54) AUTOMATIC DRIVING DEVICE

(71) Applicant: Hitachi Automotive Systems, Ltd., Hitachinaka (JP)

(72) Inventors: Masato Imai, Tokyo (JP); Takao Kojima, Tokyo (JP); Kentaro Yoshimura, Tokyo (JP); Kiyoshi Yorozuya, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 113 days.

(21) Appl. No.: 16/306,207

(22) PCT Filed: Jul. 19, 2017

(86) PCT No.: PCT/JP2017/026028  
§ 371 (c)(1),  
(2) Date: Nov. 30, 2018

(87) PCT Pub. No.: WO2018/030082  
PCT Pub. Date: Feb. 15, 2018

(65) Prior Publication Data  
US 2019/0317499 A1    Oct. 17, 2019

(30) Foreign Application Priority Data  
Aug. 8, 2016  (JP) ................ 2016-155726

(51) Int. Cl.  
*G05D 1/00* (2006.01)  
*G05D 1/02* (2020.01)

(52) U.S. Cl.  
CPC ......... *G05D 1/0088* (2013.01); *G05D 1/0221* (2013.01); *G05D 1/0231* (2013.01); *G05D 1/0257* (2013.01); *G05D 2201/0213* (2013.01)

(58) Field of Classification Search  
USPC ........................................... 701/27  
See application file for complete search history.

(56) References Cited

U.S. PATENT DOCUMENTS

| 2006/0095195 | A1 | 5/2006 | Nishimura et al. |
| 2008/0162027 | A1 | 7/2008 | Murphy et al. |

(Continued)

FOREIGN PATENT DOCUMENTS

| JP | 6-206477 A | 7/1994 |
| JP | 8-44999 A | 2/1996 |

(Continued)

OTHER PUBLICATIONS

International Search Report (PCT/ISA/210) issued in PCT Application No. PCT/JP2017/026028 dated Oct. 17, 2017 with English translation (four (4) pages).

(Continued)

*Primary Examiner* — Tyler D Paige  
(74) *Attorney, Agent, or Firm* — Crowell & Moring LLP

(57) ABSTRACT

Achieving safety and natural automatic driving needs a control platform using intelligence (such as learning function and artificial intelligence), but it is difficult to ensure operations suited for the behavior of a vehicle by the output of intelligence. An automatic driving device according to the present invention includes a control program for inputting outside information and vehicle information, and outputting a target control value for a vehicle. The control program has a first program for generating a first target control amount on the basis of a dynamically changing algorithm (which outputs operations based on learning function or artificial intelligence), and a second program for generating a second target control amount on the basis of a prescribed algorithm (which outputs operations according to traffic rules or driving morals).

5 Claims, 19 Drawing Sheets

(56) References Cited

U.S. PATENT DOCUMENTS

| | | | |
|---|---|---|---|
| 2014/0371981 A1 | 12/2014 | Nordbruch et al. | |
| 2015/0057905 A1 | 2/2015 | Niwa et al. | |
| 2015/0158486 A1 | 6/2015 | Healey et al. | |
| 2015/0308837 A1* | 10/2015 | Cudak | G01C 21/26 701/23 |
| 2016/0132705 A1 | 5/2016 | Kovarik et al. | |
| 2017/0169208 A1* | 6/2017 | Jantz | G06N 3/0454 |
| 2017/0285585 A1* | 10/2017 | Weast | G06N 5/046 |
| 2018/0089563 A1* | 3/2018 | Redding | G06F 16/9027 |

FOREIGN PATENT DOCUMENTS

| | | |
|---|---|---|
| JP | 2006-131055 A | 5/2006 |
| JP | 2009-205646 A | 9/2009 |
| JP | 2013-237290 A | 11/2013 |
| JP | 2015-722 A | 1/2015 |
| JP | 2015-41241 A | 3/2015 |

OTHER PUBLICATIONS

Japanese-language Written Opinion (PCT/ISA/237) issued in PCT Application No. PCT/JP2017/026028 dated Oct. 17, 2017 (four (4) pages).
Extended European Search Report issued in European Application No. 17839155.3 dated Feb. 26, 2020 (eight (8) pages).

* cited by examiner

WHEN PASSING THROUGH INTERSECTION REQUIRING STOP

WHEN CHANGING LANE

FIG. 12A
WHEN MERGING TO MAIN LINE IN WHICH TRAFFIC CONGESTION OCCURS
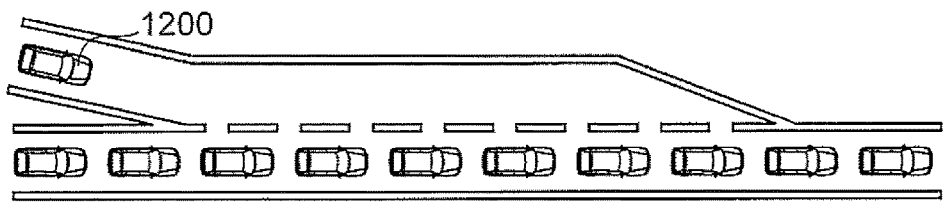
TRAJECTORY/SPEED PLAN BASED ON FIRST PROGRAM
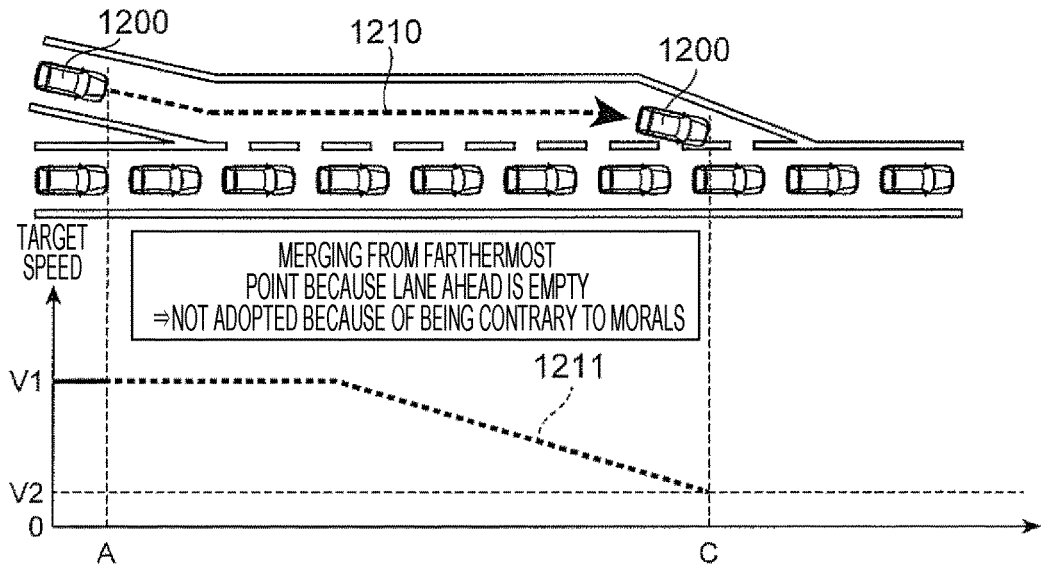
FIG. 12B
TRAJECTORY/SPEED PLAN BASED ON SECOND PROGRAM
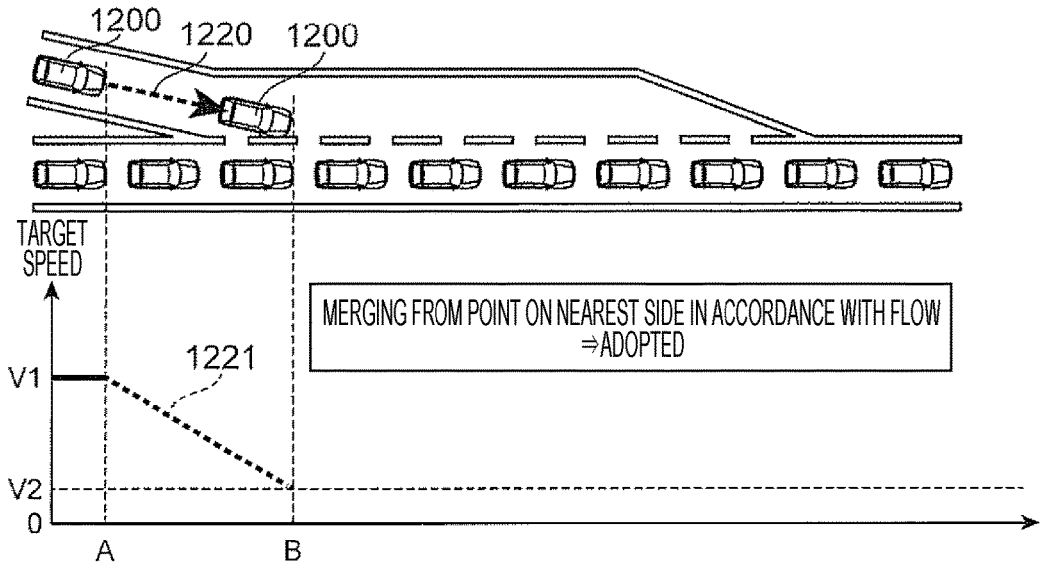

FIG. 14A

EXAMPLE OF ADOPTING FIRST TARGET CONTROL AMOUNT

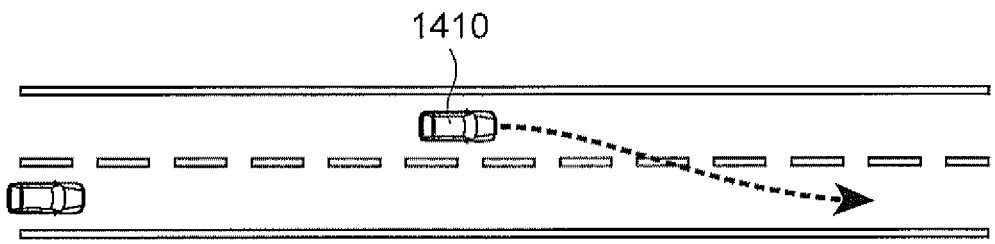

WHEN NO OBSTACLES THAT BLOCK HOST VEHICLE FROM TRAVELING ARE PRESENT NEARBY
⇒THERE IS NO CONCERN IN TRAVELING IN ACCORDANCE WITH DRIVER'S PREFERENCE

FIG. 14B

EXAMPLE OF ADOPTING SECOND TARGET CONTROL AMOUNT

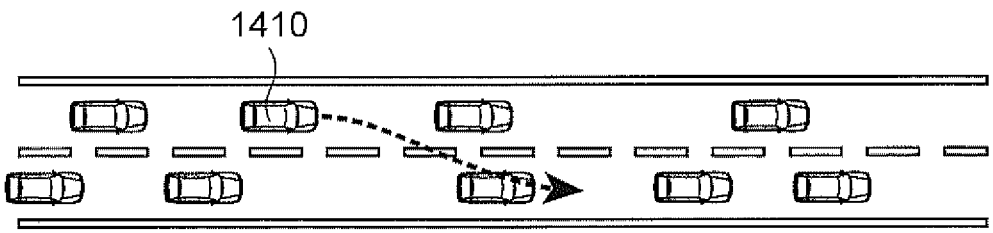

WHEN OBSTACLES THAT BLOCK HOST VEHICLE FROM TRAVELING ARE PRESENT NEARBY
⇒THERE IS NO CONCERN IN TRAVELING ON BASIS OF TRAFFIC RULES AND DRIVING MORALS

AUTOMATIC DRIVING DEVICE

TECHNICAL FIELD

The present invention relates to an automatic driving device that automatically controls a vehicle to a destination by automatic steering and automatic speed control.

BACKGROUND ART

Various technologies for recognizing objects (vehicles, pedestrians, structures, and the like) around a host vehicle and road markings/signs (pavement paints such as lane-dividing lines, signs such as stop sign, and the like) using external recognition sensors such as in-vehicle cameras and radars have been proposed. Various technologies also have been proposed to control a host vehicle using these technologies and improve the security and comfort of occupants; additionally, automatic driving technologies for traveling automatically to a destination by controlling the steering and speed of the host vehicle in an automated manner have started to be proposed. In order to achieve such an automatic driving technology, it is required to precisely judge the situation even under a complicated environment to control the vehicle and, for example, it is necessary to be able to deal with even situations without precedent by applying artificial intelligence and machine learning to this situation judgment.

There is a technology for controlling a vehicle in such a manner that information necessary for predicting travel control from host vehicle position information and vehicle information is stored in a learning database as history information and, on the basis of, for example, road information ahead of the host vehicle position and a past traveling pattern predicted from the history information, future travel control of the host vehicle is predicted, while control command values for a transmission, regenerative brake ON/OFF, traveling mode, and the like are created on the basis of travel control predicted by a learning unit (refer to PTL 1).

CITATION LIST

Patent Literature

PTL 1: JP 2013-237290 A

SUMMARY OF INVENTION

Technical Problem

With the technology disclosed in PTL 1, however, since the vehicle is controlled on the basis of the travel control predicted by the learning unit, the vehicle is controlled as predicted even when the prediction fails.

Nevertheless, the vehicle control applied in PTL 1 is restricted to a transmission, regenerative brake ON/OFF, traveling mode, and the like and safety is not impaired even when the prediction by the learning unit fails. In this manner, machine learning and artificial intelligence have a possibility of failing predictions or making unexpected judgment depending on learning methods and experience values (accumulated amount of databases, and the like) and thus there has been a problem such as difficulties in applying machine learning and artificial intelligence to vehicle control or the like concerning safety.

The present invention has been made in view of the above circumstances and it is an object of the present invention to provide an automatic driving device using intelligence such as machine learning and artificial intelligence for achieving safety and natural automatic driving.

Solution to Problem

In order to solve the above problem, the present invention provides an automatic driving device including a control program for inputting outside information and vehicle information, and outputting a target control value for a vehicle, in which the control program has a first program for generating a first target control amount on the basis of a dynamically changing algorithm, and a second program for generating a second target control amount on the basis of a prescribed algorithm.

Advantageous Effects of Invention

According to the present invention, automatic driving under a complicated environment and vehicle control reflecting personal preferences can be achieved by the dynamically changing algorithm such as machine learning or artificial intelligence, and at the same time vehicle control ensuring the operation is fulfilled by the prescribed algorithm according to traffic rules or with upper and lower limit values of control amount fixed in advance, whereby the quality as an automatic driving device can be secured. Specifically, safety can be secured by the latter prescribed algorithm ensuring the operation.

Further features relating to the present invention will become apparent from the description in this specification and the accompanying drawings. In addition, problems, configurations, and effects other than those mentioned above will be clarified by the description of the following embodiments.

BRIEF DESCRIPTION OF DRAWINGS

FIG. 9 is a diagram

FIG. 10 is a diagram

FIG. 12 is a diagram FIGS. 12A and 12B are diagrams for explaining an automatic driving process.

FIGS. 14A and 14B are diagrams for explaining an automatic driving process.

DESCRIPTION OF EMBODIMENTS

Working examples will be described below with reference to the drawings.

Figure 1:
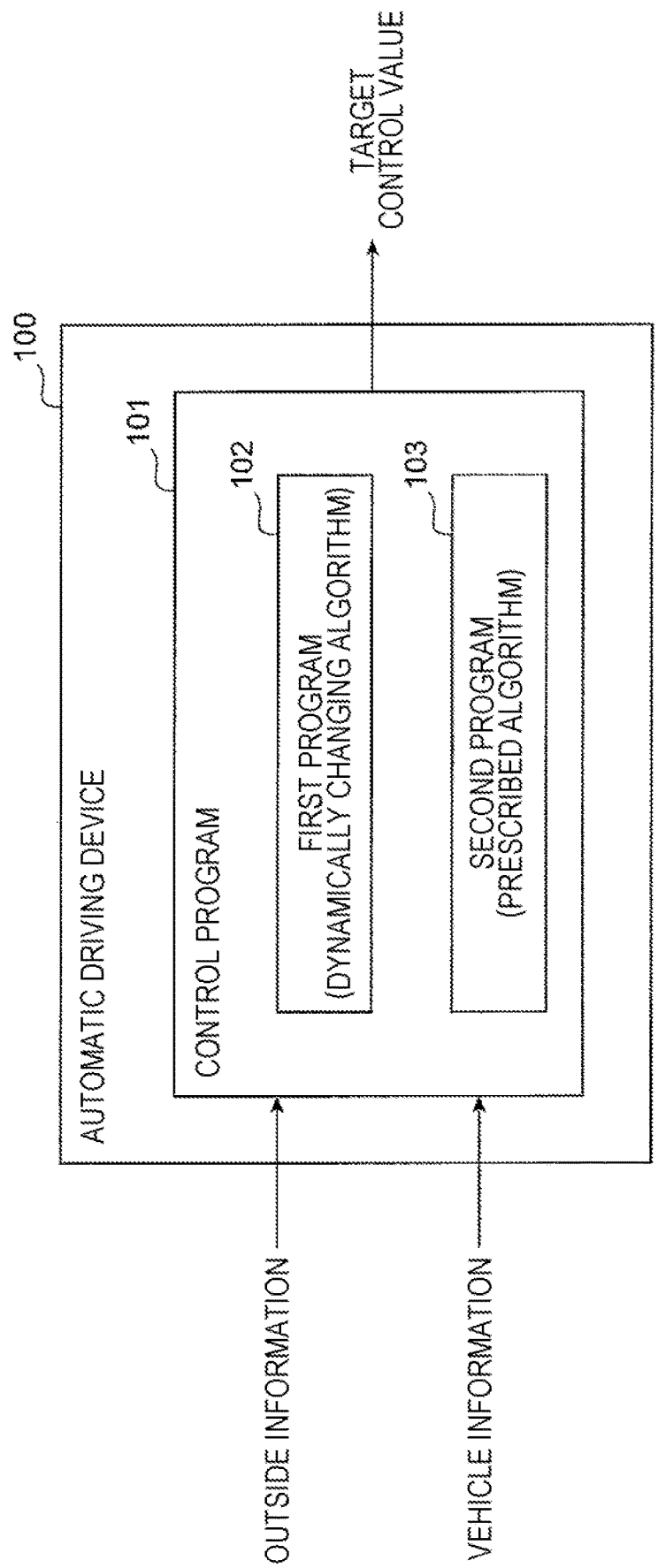
FIG. 1 is a basic configuration diagram of an automatic driving device to which the present invention is applied.

FIG. 1 illustrates a basic structure of an automatic driving device in which the present invention is carried out. The automatic driving device 100 in FIG. 1 is a computer that controls a host vehicle and implements an automatic driving function of the host vehicle by executing a control program 101. The control program 101 includes a first program 102 having a dynamically changing algorithm and a second program 103 having a prescribed algorithm.

The first program 102 is constituted by a dynamically changing algorithm such as learning function or artificial intelligence and is a program highly likely to output different values for the same input with the lapse of time. The dynamically changing algorithm is a processing technique for generating a target control amount on the basis of artificial intelligence or learning function. The learning function here is a function to store input information, executed maneuvers and the like and to conduct optimization so as to perform a more appropriate process grounded on such storage and, for example, is capable of reflecting tastes of a driver on acceleration/deceleration, lateral acceleration, inter-vehicle distance, and the like in automatic driving. The learning function also includes ones that use machine learning and artificial intelligence to understand input information and make appropriate output.

The second program 103 is constituted by a prescribed algorithm based on rules and regulations defined in advance (hereinafter referred to as "rule base") and is a program that outputs the same value or a range thereof for the same input. The prescribed algorithm is a processing technique for generating a target control amount on the basis of at least traffic rules and driving morals. However, this does not apply when rules and regulations are changed. When the prescribed algorithm is applied to automobiles, rules and regulations correspond to traffic rules and driving morals, but it is needless to say that these rules and regulations differ depending on the country and region to which they apply.

As described above, by separating a program having a dynamically changing algorithm and a program having a prescribed algorithm as a constitution of a program, the effect of reducing the number of person-hours for carrying out the quality check of programs, such as maintenance and updating, is expected.

First Embodiment

Figure 2:
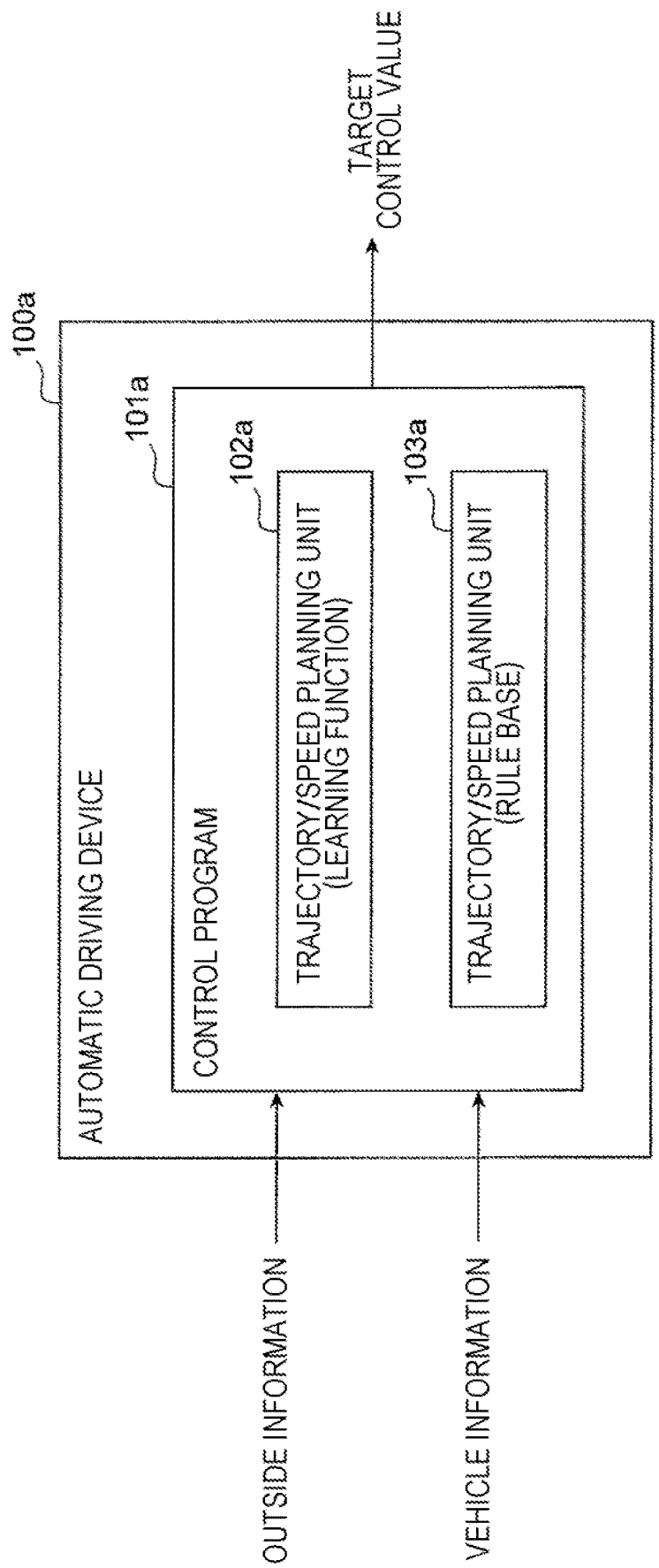
FIG. 2 is a schematic configuration diagram of an automatic driving device according to a first embodiment of the present invention.
Figure 3:
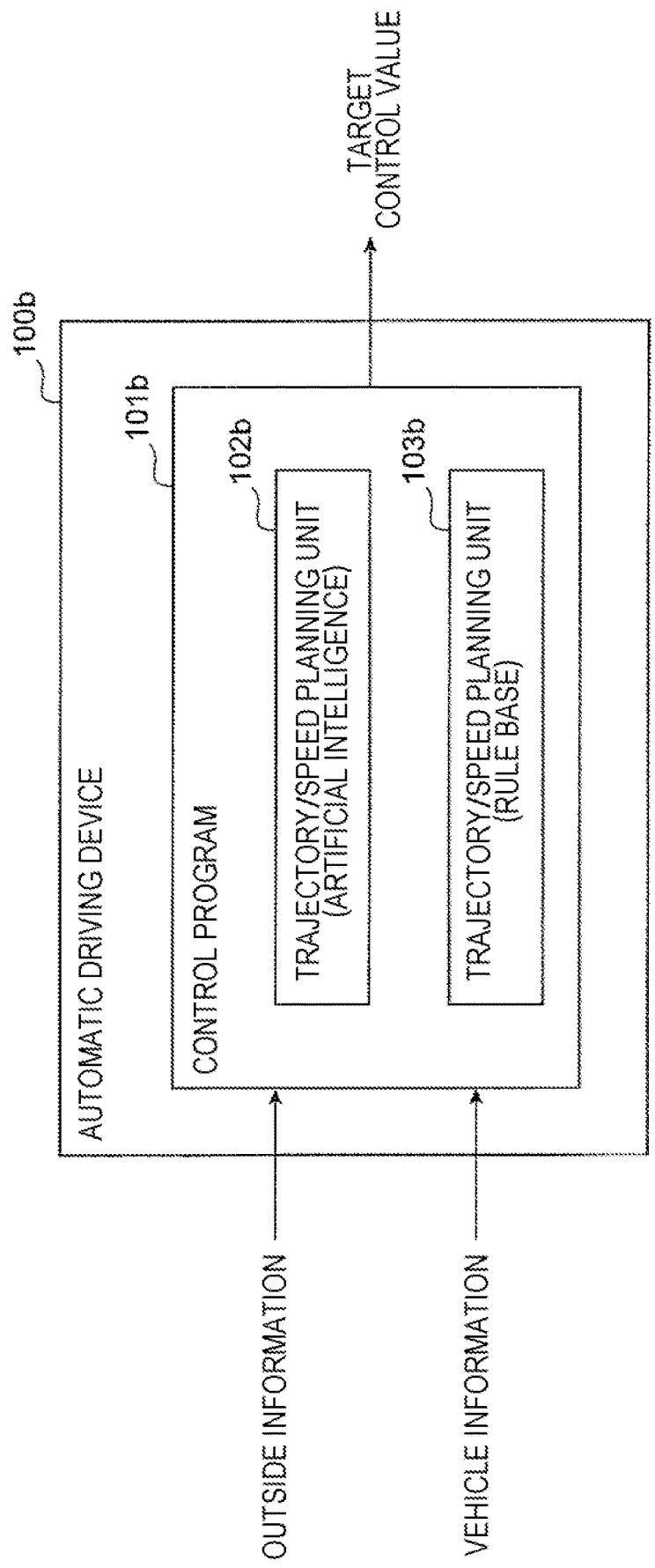
FIG. 3 is a schematic configuration diagram of the automatic driving device according to the first embodiment of the present invention.

FIGS. 2 and 3 are schematic configuration diagrams of an automatic driving device according to a first embodiment of the present invention.

FIGS. 2 and 3 each illustrate a configuration in which the first program and the second program in the basic structure in FIG. 1 are replaced by respective specific functions.

A trajectory/speed planning unit (learning function) 102a in FIG. 2 is a program for planning a target trajectory and a target speed of a host vehicle using the learning function, and uses outside information (environmental information and road information around the host vehicle, and the like) and vehicle information (vehicle speed, steering angle, yaw rate, and the like) as inputs to output a target control value (a set of the target trajectory and the target speed, or a target control amount for each actuator).

A trajectory/speed planning unit (rule base) 103a in FIG. 2 is a program for planning a target trajectory and a target speed of the host vehicle on the basis of traffic rules and driving morals, and uses outside information (environmental information and road information around the host vehicle, and the like) and vehicle information (vehicle speed, steering angle, yaw rate, and the like) as inputs to output a target control value (a set of the target trajectory and the target speed, or a target control amount for each actuator).

A trajectory/speed planning unit (artificial intelligence) 102b in FIG. 3 is a program for planning a target trajectory and a target speed of a host vehicle using artificial intelligence, and uses outside information (environmental information and road information around the host vehicle, and the like) and vehicle information (vehicle speed, steering angle, yaw rate, and the like) as inputs to output a target control value (a set of the target trajectory and the target speed, or a target control amount for each actuator).

The trajectory/speed planning unit (rule base) 103b in FIG. 3 is the same as the trajectory/speed planning unit (rule base) 103a in FIG. 2.

Figure 4:
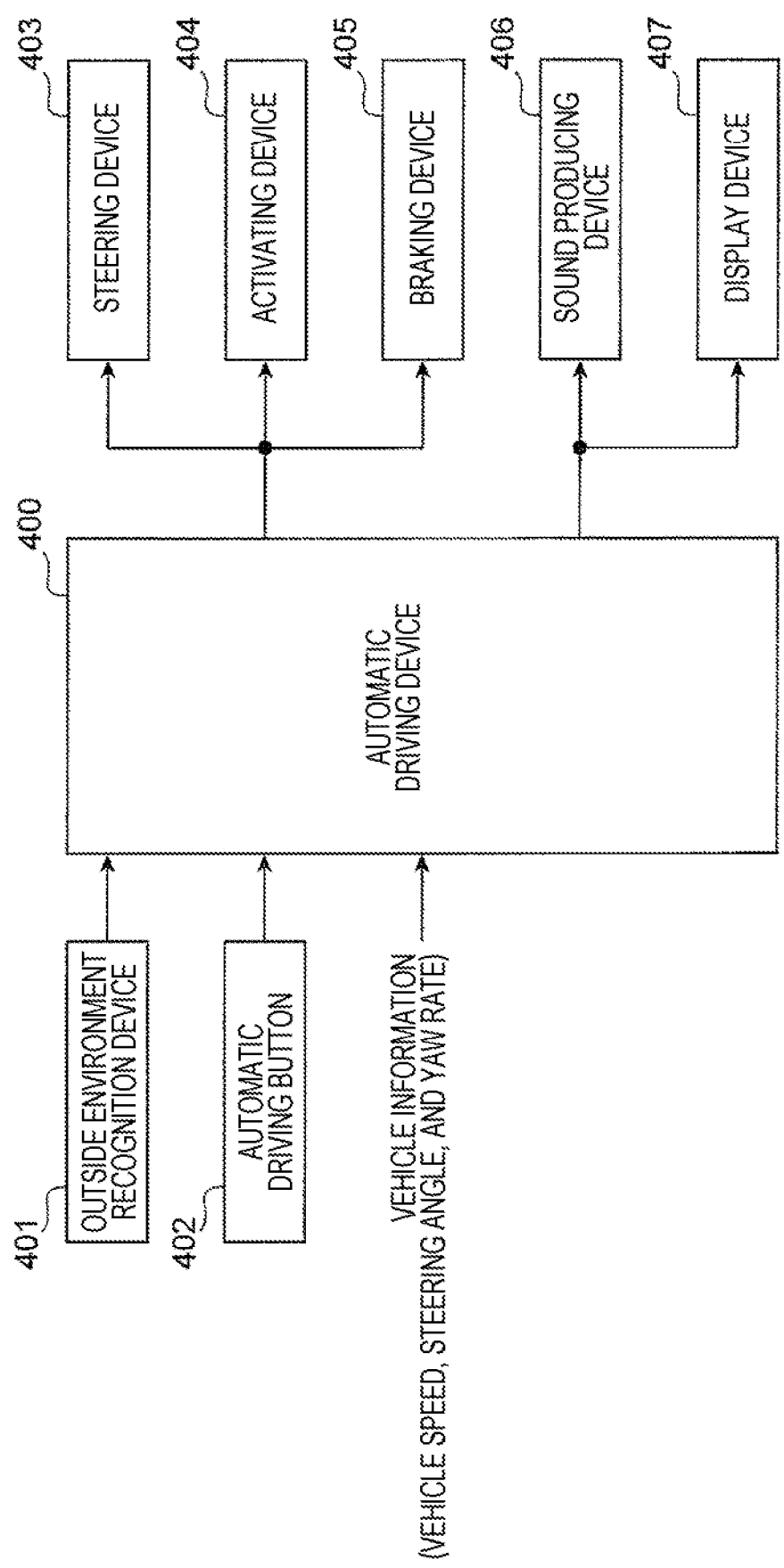
FIG. 4 is a schematic configuration diagram illustrating the automatic driving device according to the first embodiment of the present invention and peripheral devices thereof.

FIG. 4 is a schematic configuration diagram illustrating the automatic driving device according to the first embodiment of the present invention and peripheral devices thereof. The automatic driving device 400 is synonymous with the automatic driving devices 100, 100a, and 100b described in FIGS. 1 to 3 and is connected to an outside environment recognition device 401, an automatic driving button 402, a steering device 403, an activating device 404, a braking device 405, a sound producing device 406, and a display device 407. In addition, the automatic driving device 400 is connected to a controller area network (CAN) (not illustrated) or the like, which is a communication network of the host vehicle, and vehicle information on the host vehicle, such as a vehicle speed, a steering angle, and a yaw rate, is input.

The outside environment recognition device 401 acquires information regarding surrounding environment of the host vehicle and, for example, is an in-vehicle stereo camera for photographing the front of the host vehicle, or four in-vehicle cameras for separately photographing the surrounding environment on the front, rear, right side, and left side of the host vehicle. These in-vehicle cameras use the obtained image data to detect the shape and position of an object such as a stationary three-dimensional object, a moving object, a pavement paint such as a lane marking, and a sign around the host vehicle, and additionally has a function of determining whether a road surface is acceptable for the host vehicle to travel on by detecting irregularities or the like on the road surface. The stationary three-dimensional object is, for example, a parked vehicle, a wall, a pole, a pylon, a curbstone, or a car stop. The moving object is, for example, a pedestrian, a bicycle, a motorcycle, or a vehicle. Hereinafter, both of the stationary three-dimensional object and the moving object are collectively referred to as an obstacle.

The shape and position of the object are detected using a pattern matching technique or other known technologies. The position of the object is expressed, for example, using a coordinate system having the origin at the position of the in-vehicle camera that photographs the front of the host vehicle. Then, the obtained information such as the type, distance, and direction of the object is output to the automatic driving device 400 using a leased line, a CAN or the like.

Note that an approach to output the image obtained by the in-vehicle camera to the automatic driving device 400 using a leased line or the like and process the image data in the automatic driving device 400 may be employed. In addition to the in-vehicle cameras, it is also possible to use a radar that measures the distance to an object using millimeter waves or a laser, a sonar that measures the distance to an object using ultrasonic waves, and the like such that the obtained information such as the distance to the object and the direction thereof is output to the automatic driving device 400 using a leased line, a CAN, or the like. Furthermore, a communication device for communicating with the outside of the host vehicle may be included in the outside environment recognition device 401, so as to communicate with a vehicle around the host vehicle to exchange information on position and speed, and the like, or communicate with an communication unit on roadside to exchange information that cannot be detected by a sensor mounted on the host vehicle (such as information on an obstacle in a blind spot of the host vehicle).

The steering device 403 is constituted by an electric power steering, a hydraulic power steering, and the like capable of controlling the steering angle with an electric or hydraulic actuator or the like according to an activation command from the outside. The steering device 403 can control the trajectory of the host vehicle to the target trajectory by activation of the actuator.

The activating device 404 is constituted by an engine system capable of controlling the engine torque with an electric throttle or the like according to an activation command from the outside, or an electric power train system capable of controlling the activation force with a motor or the like according to an activation command from the outside, or the like.

The braking device 405 is constituted by an electric brake, a hydraulic brake, or the like capable of controlling the braking force with an electric or hydraulic actuator or the like according to a braking command from the outside. The braking device 405 can control the speed of the host vehicle to the target speed by activation of the actuator.

The sound producing device 406 is constituted by a speaker or the like and is used for outputting warnings, voice guidance and the like to the driver.

The display device 407 is constituted by a display of a navigation device or the like, a meter panel, a warning lamp, and the like. In addition to a maneuver screen of the automatic driving device 400, the display device 407 displays, for example, a screen on which the traveling state of the host vehicle can be visually expressed.

The automatic driving button 402 is a maneuvering member provided at a position maneuverable by the driver and outputs a signal to switch the operation of the automatic driving device 400 to the automatic driving device 400 on the basis of the maneuver by the driver. Note that the automatic driving button 402 can be installed as a switch at a place easily maneuverable by the driver around the steering wheel, and additionally, in a case where the display device 407 is a touch panel type display, a button may be displayed on the display device 407 so as to be maneuverable by the driver.

Next, processing procedures of the automatic driving device 400 will be described with reference to flowcharts.

FIGS. 5 to 8 are flowcharts illustrating examples of processing procedures of the automatic driving device 400.

Figure 5:
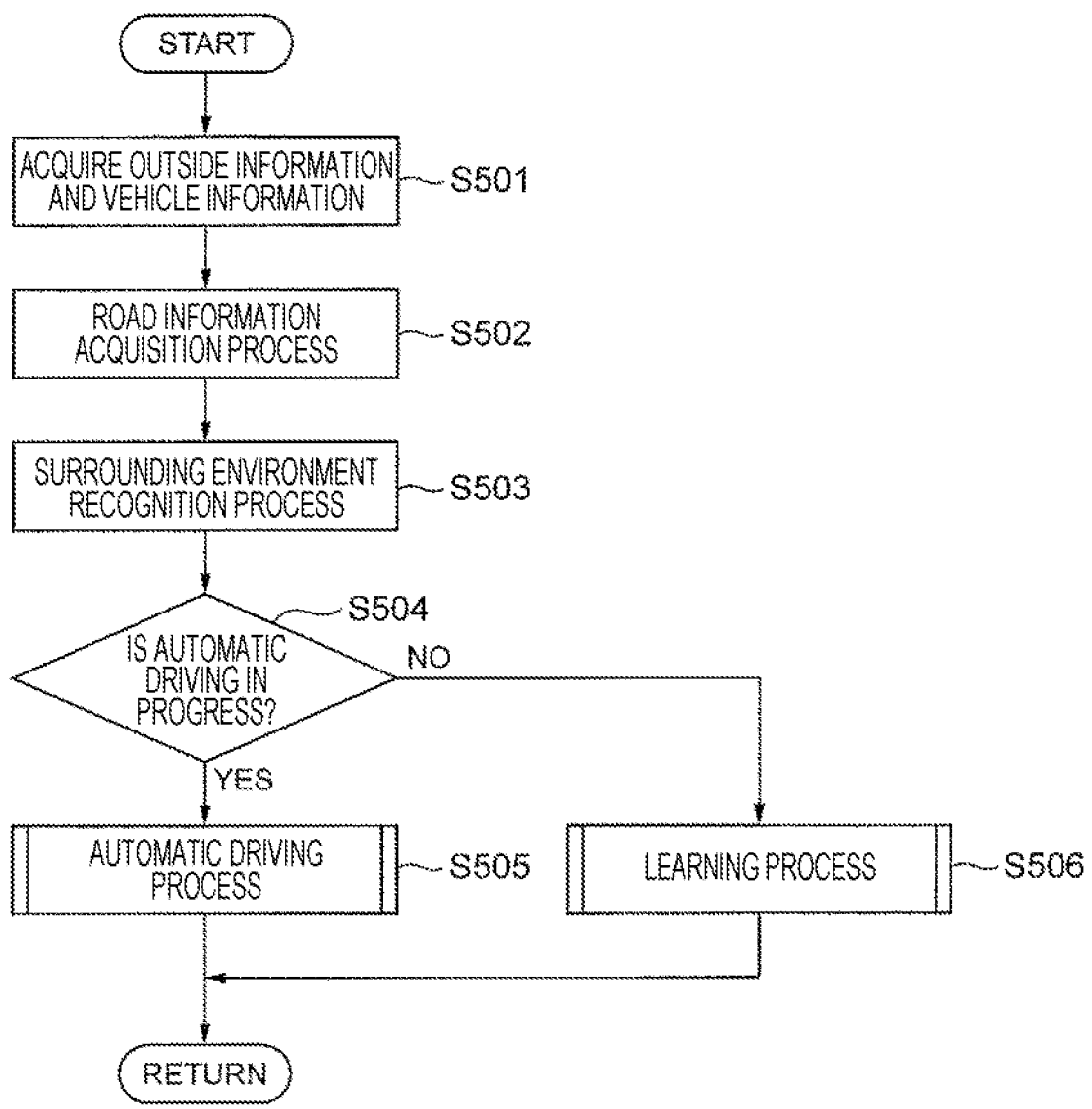
FIG. 5 is a flowchart for explaining the operation of a vehicle control device according to the first embodiment of the present invention.

In process S501 in FIG. 5, the outside information and the vehicle information are acquired and the procedure proceeds to process S502. Here, the outside information is information input by the outside environment recognition device 401 and the vehicle information is information on the host vehicle, such as the vehicle speed, steering angle, and yaw rate.

In process S502, the road information is acquired and the procedure proceeds to process S503. Here, the road information is map data around the current host vehicle and this map data includes shape data close to the actual road shape expressed by polygons, polylines, and the like, traffic restriction information (speed limit, permitted vehicle type, and the like), lane classification (main line, overtaking lane, climbing lane, through lane, left turning lane, right turning lane, and the like), whether traffic lights and signs are present (if any is present, position information thereon), and the like.

In process S503, a process of grasping the traveling environment around the host vehicle is carried out using the outside information acquired in process S501 and the road information acquired in process S502, and the procedure proceeds to process S504. Specifically, the outside information on an obstacle or the like is placed on the map data and the lane position where the host vehicle can travel, the available turning space in the intersection, and the like are detected.

In process S504, it is judged whether the automatic driving is in progress. When the automatic driving is in progress, an automatic driving process in S505 is executed to terminate the series of processes and the procedure returns to process S501. On the other hand, when the automatic driving is not in progress in process S504, a learning process in S506 is executed to terminate the series of processes and the procedure returns to process S501.

Figure 6:
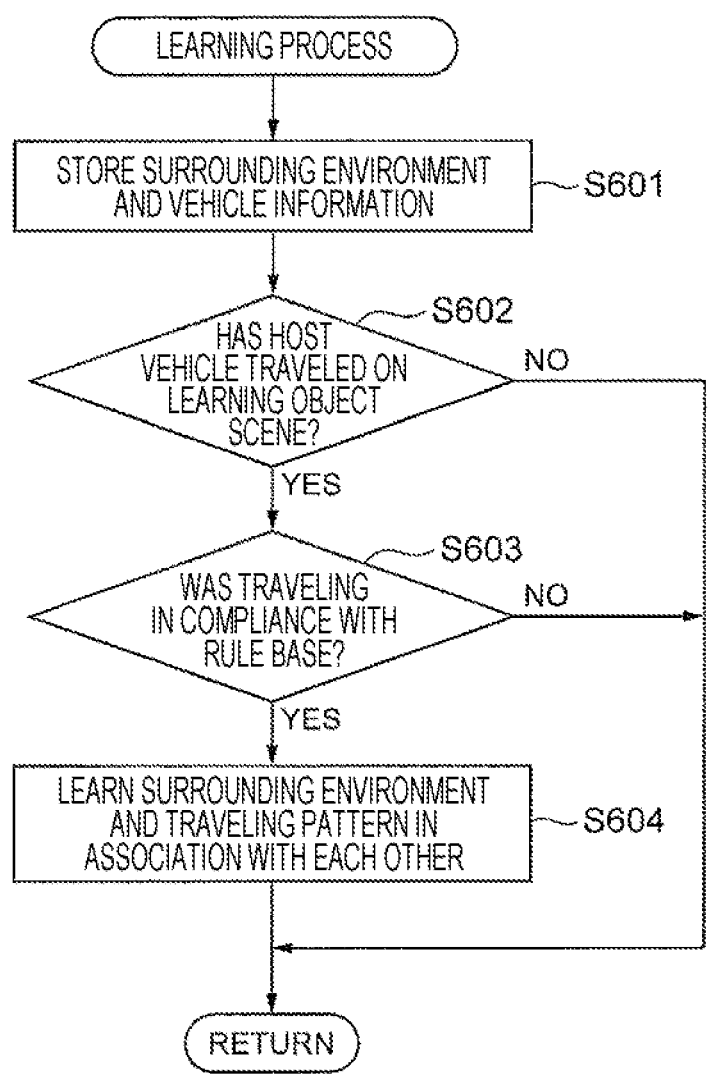
FIG. 6 is a flowchart for explaining the operation of the vehicle control device according to the first embodiment of the present invention.

FIG. 6 is a flowchart illustrating an example of a processing procedure of the learning process in process S506 in FIG. 5.

In process S601 in FIG. 6, the surrounding environment recognized in process S503 and the vehicle information acquired in process S501 are stored in an internal memory or the like of the automatic driving device 400 and the procedure proceeds to process S602.

In process S602, it is determined whether the host vehicle has traveled on a learning object scene, on the basis of the information stored in process S601. When it is determined that the host vehicle has traveled on a learning object scene, the procedure proceeds to process S603 and, when it is determined that the host vehicle has not traveled on a learning object scene, the series of processes is terminated. Here, a learning object scene is, for example, as follows.

When traveling by following the preceding vehicle,

When stopping at a stop sign or a red light

When restarting after stopping at a stop sign or a red light,
—When passing through an intersection
When traveling on a curve
When changing a lane (including merging and branching)
When traveling while avoiding an obstacle on the shoulder In process S603, it is determined whether the manner of the host vehicle in the learning object scene determined in process S602 was traveling in compliance with the rule base. When the manner of the host vehicle was traveling in compliance with the rule base, the procedure proceeds to process S604 and, when the manner of the host vehicle was not traveling in compliance with the rule base, the series of processes is terminated. Here, the traveling in compliance with the rule base means traveling that abides by traffic rules and is not contrary to driving morals.

In process S604, the surrounding environment and the traveling pattern of the host vehicle are learned in association with each other and the series of processes is terminated. Here, for example, specific learning contents are as follows.

Figure 7:
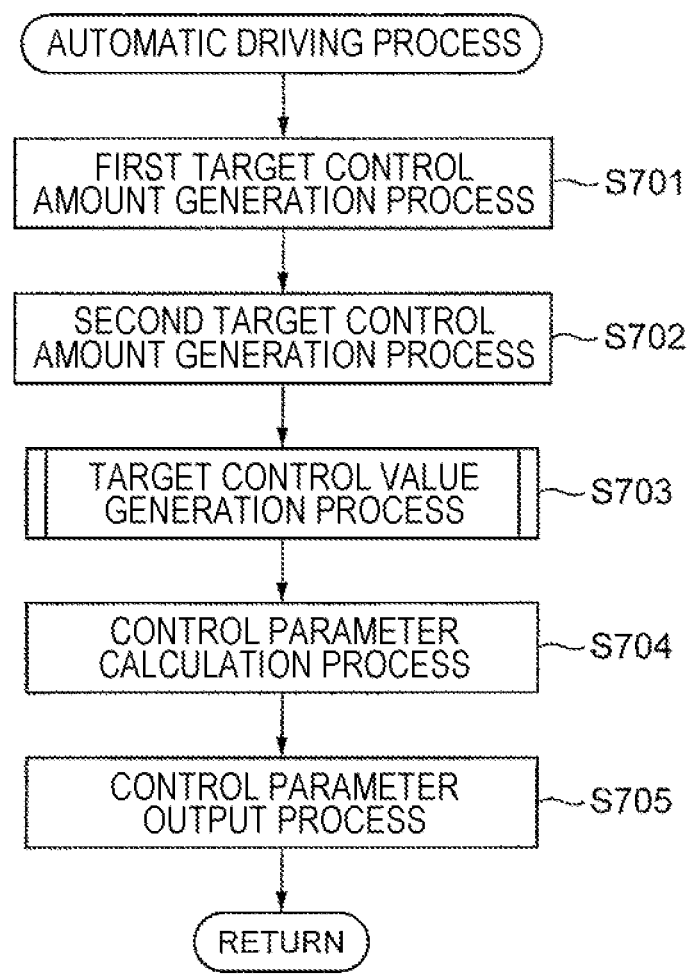
FIG. 7 is a flowchart for explaining the operation of the vehicle control device according to the first embodiment of the present invention.

Inter-vehicle distance and acceleration/deceleration when traveling by following the preceding vehicle
Acceleration/deceleration, stop position, and start timing with respect to a stop line and a traffic light, —Passage speed and traveling locus within the intersection
Speed at turning
Traveling locus, lateral acceleration, and inter-vehicle distances to surrounding vehicles at lane change
How to put a safety margin and a speed adjustment method when avoiding an obstacle FIG. 7 is a flowchart illustrating an example of a processing procedure of the automatic driving process in process S505 in FIG. 5.

In process S701 in FIG. 7, the target control amount is generated by the first program and the procedure proceeds to process S702. In this example, the target trajectory and the target speed of the host vehicle are generated according to a trajectory/speed plan updated by the learning process described in FIG. 6.

In process S702, the target control amount is generated by the second program and the procedure proceeds to process S703. In this example, the target trajectory and the target speed of the host vehicle are generated according to a trajectory/speed plan based on the rule base.

In process S703, a target control value which is the final target control amount is generated from the first target control amount generated in process S701 and the second target control amount generated in process S702 and the procedure proceeds to process S704.

In process S704, a control parameter for causing the host vehicle to travel according to the target trajectory and the target speed of the host vehicle, which are the target control value generated in process S703, is calculated and the procedure proceeds to process S705. Here, examples of the control parameter include a target steering torque, a target engine torque, and a target brake pressure.

In process S705, each of the control parameters calculated in process S704 is output to the steering device 403, the activating device 404, and the braking device 405 and the series of processes is terminated.

Note that the target steering torque for implementing the target steering angle is cited as the control parameter to be output to the steering device 403, but it is also possible to directly output the target steering angle, depending on the configuration of the steering device 403. In addition, the target engine torque, the target brake pressure, and the like for implementing the target speed are cited as the control parameters to be output to the activating device 404 and the braking device 405, but it is also possible to directly output the target speed, depending on the configuration of the activating device 404 and the braking device 405.

Figure 8:
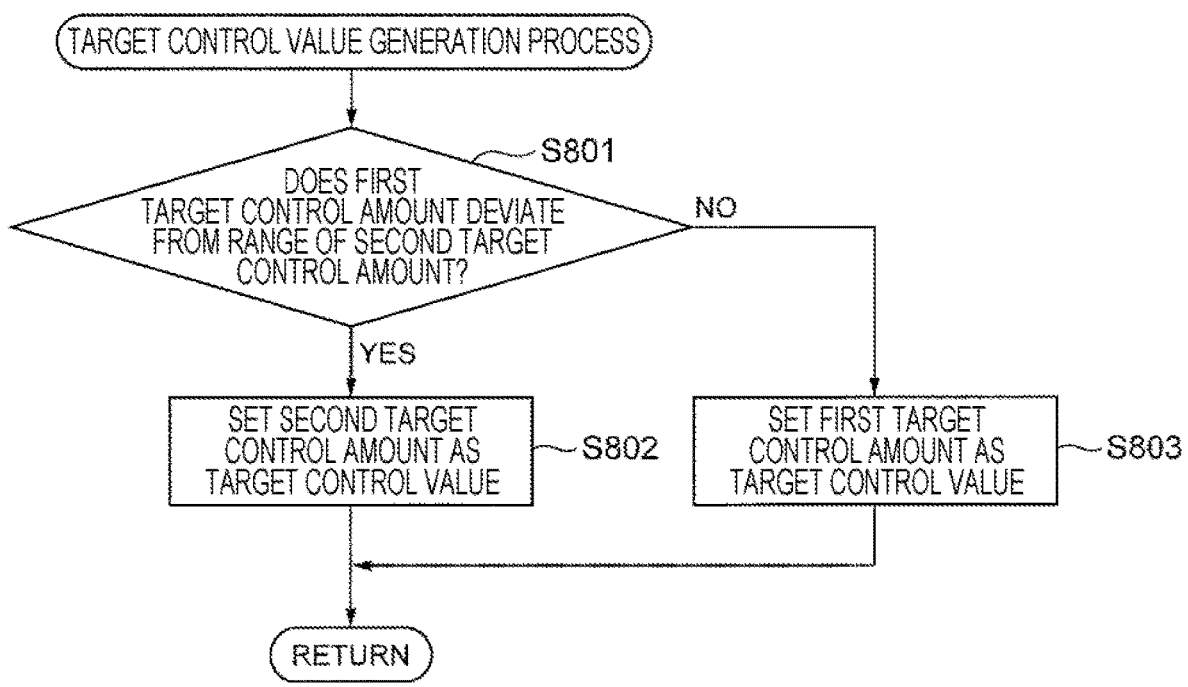
FIG. 8 is a flowchart for explaining the operation of the vehicle control device according to the first embodiment of the present invention.

FIG. 8 is a flowchart illustrating an example of a processing procedure of the target control value generation process in process S703 in FIG. 7.

In process S801 in FIG. 8, it is determined whether the first target control amount deviates from the range of the second target control amount by comparing the first target control amount generated in process S701 with the second target control amount generated in process S702. When it is judged that the first target control amount deviates from the range of the second target control amount, the procedure proceeds to process S802 and the second target control amount is set as the target control value in process S802; then, the series of processes is terminated. On the other hand, when it is judged in process S801 that the first target control amount does not deviate from the range of the second target control amount, the procedure proceeds to process S803 and the first target control amount is set as the target control value in process S803; then, the series of processes is terminated.

Next, an example of the learning process described in FIG. 6 will be indicated with reference to FIGS. 9 and 10.

FIG. 9 illustrates scenes in which the learning process in process S604 in FIG. 6 is executed and description will be given using two scenes: (a) passing through an intersection requiring a stop and (b) changing a lane.

Figure 9A:
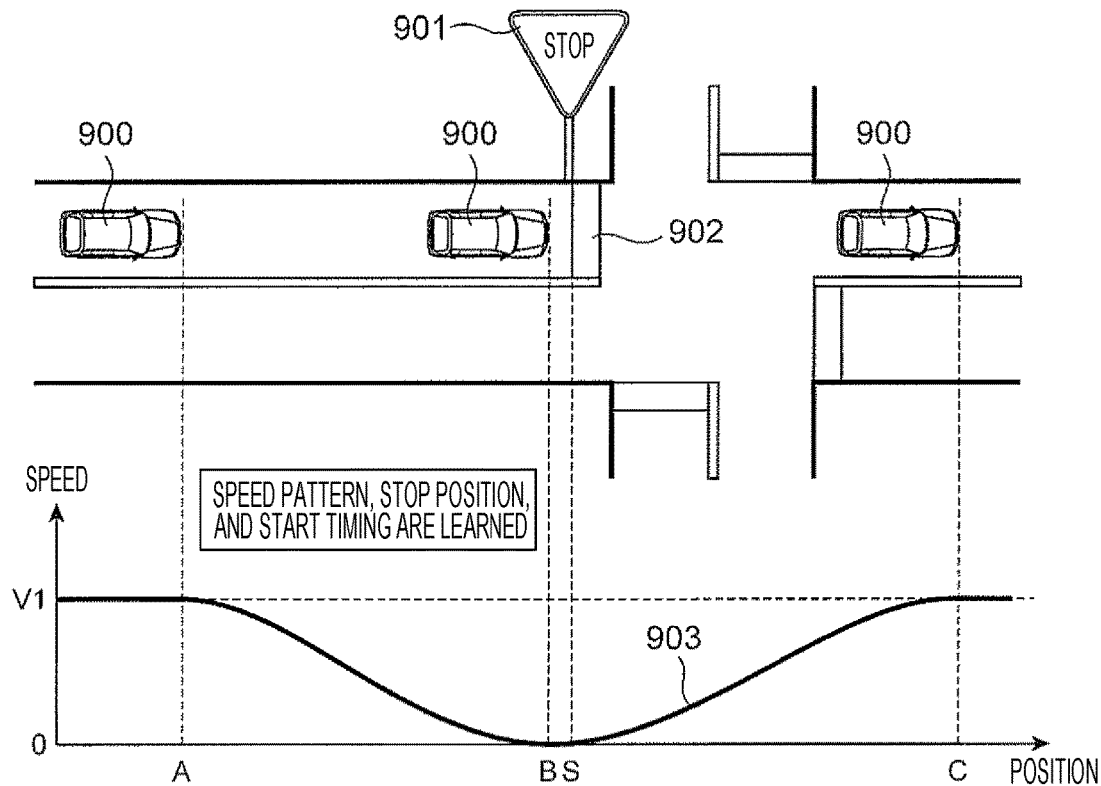
FIGS. 9A and 9B are diagrams for explaining a learning process.

FIG. 9(a) is a diagram for explaining a situation supposing a scene where a host vehicle 900 manually driven by a driver goes straight ahead at an intersection requiring a stop while traveling on a road with one lane each way and the graph illustrates changes in speed of the host vehicle 900.

When the host vehicle 900 reaches a point A while traveling at a speed V1, the host vehicle 900 begins to decelerate toward a stop line 902 where a stop sign 901 is present, and temporarily stops at a point B on the near side of a point S of the stop line 902. Thereafter, the driver of the host vehicle 900 confirms safety in the intersection and, when judging that safety is assured, restarts the host vehicle 900 to pass through a point C. First, this series of traveling scenes is determined to be learning object scenes by the determination in process S602 in FIG. 6. Next, when it is determined by the determination in process S603 in FIG. 6 that this series of traveling actions was traveling in compliance with the rule base, the learning process in process S604 in FIG. 6 is executed.

The contents learned here are a speed pattern 903 (more specifically, the average deceleration between the points A and B and the average acceleration between the points B and C), the stop position (the distance between B and S), the start timing (the stopping time at the point B), and the like of the host vehicle 900.

Figure 9B:
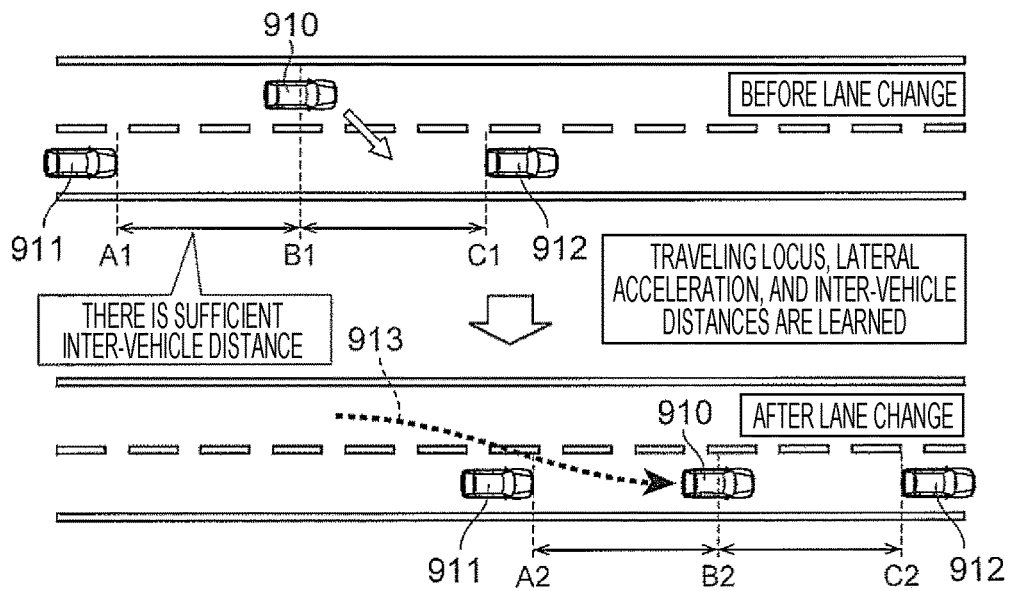

FIG. 9(b) is a diagram for explaining a situation supposing a scene where a host vehicle 910 manually driven by a driver is changing the lane between a vehicle 911 and a vehicle 912 on a right lane, while traveling on a left lane of a road with two lanes each way.

When the host vehicle 910 reaches a point B1, the driver of the host vehicle 910 judges that there is a sufficient inter-vehicle distance between the vehicle 911 at a point A1 and the vehicle 912 at a point C1 and turns on the blinker to change the lane with a locus indicated by a dotted line 913. Then, at the time point when the host vehicle 910 reaches a point B2, the lane change is completed and the blinker is turned off. Note that it is assumed that the vehicle 911 is located at a point A2 and the vehicle 912 is located at a point C2 at the time when the lane change is completed and sufficient inter-vehicle distances are kept between the respective vehicles. First, this series of traveling scenes is determined to be learning object scenes by the determination in process S602 in FIG. 6. Next, when it is determined by the determination in process S603 in FIG. 6 that this series of traveling actions was traveling in compliance with the rule base, the learning process in process S604 in FIG. 6 is executed.

The contents learned here are the traveling locus 913, the lateral acceleration, the inter-vehicle distances to surrounding vehicles (the distance between A1 and B1 and the distance between B1 and C1 at the beginning of lane change), and the like of the host vehicle 910.

FIG. 10 illustrates scenes in which the learning process in process S604 in FIG. 6 is not executed and, similarly to FIG. 9, description will be given using two scenes: (a) passing through an intersection requiring a stop and (b) changing a lane.

Figure 10A:
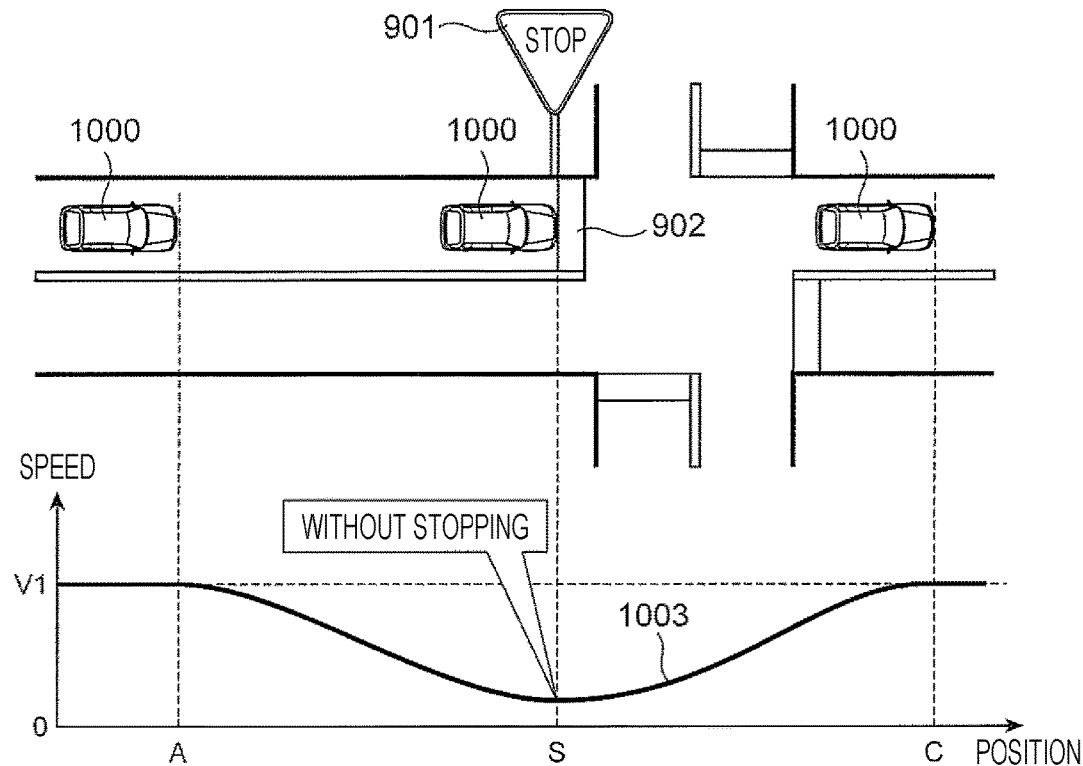
FIGS. 10A and 10B are diagrams for explaining a learning process.

FIG. 10(a) is a diagram for explaining a situation supposing a scene where a host vehicle 1000 manually driven by a driver goes straight ahead at an intersection requiring a stop while traveling on a road with one lane each way and the graph illustrates changes in speed of the host vehicle 1000.

When the host vehicle 1000 reaches a point A while traveling at a speed V1, the host vehicle 1000 begins to decelerate toward a stop line 902 where a stop sign 901 is present, and cancels the deceleration in the vicinity of a point S of the stop line 902 to enter the intersection without stopping. Thereafter, the driver of the host vehicle 1000 confirms safety in the intersection and, when judging that safety is assured, accelerates the host vehicle 1000 to pass through a point C. First, this series of traveling scenes is determined to be learning object scenes by the determination in process S602 in FIG. 6. Next, since the vehicle did not observe the traffic rules (since the vehicle violated the traffic rules) while traveling, such as not stopping at the stop line with the stop sign during this series of traveling actions, it is not determined by the determination in process S603 in FIG. 6 that this series of traveling actions was traveling in compliance with the rule base and the learning process in process S604 in FIG. 6 is not executed.

Therefore, the traveling behavior at this time is not learned.

Figure 10B:
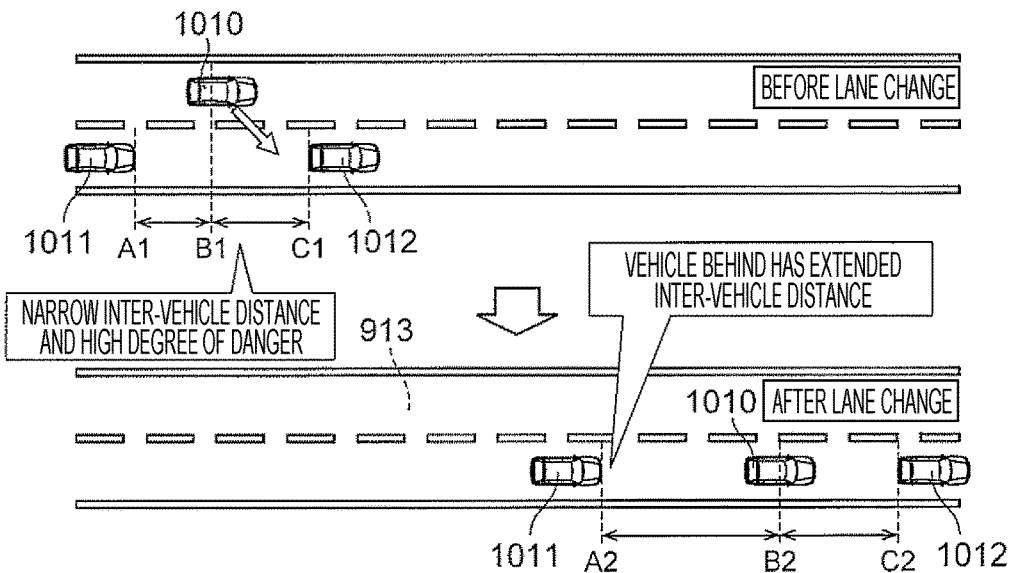

FIG. 10(b) is a diagram for explaining a situation supposing a scene where a host vehicle 1010 manually driven by a driver is changing the lane between a vehicle 1011 and a vehicle 1012 on a right lane, while traveling on a left lane of a road with two lanes each way.

When the host vehicle 1010 reaches a point B1, the driver of the host vehicle 1010 turns on the blinker toward a space between the vehicle 1011 at a point A1 and the vehicle 1012 at a point C1 to change the lane. Then, at the time point when the host vehicle 1010 reaches a point B2, the lane change is completed and the blinker is turned off. Note that it is assumed that the vehicle 1011 is located at a point A2 and the vehicle 1012 is located at a point C2 at the time when the lane change is completed and the vehicle 1011 behind has extended the inter-vehicle distance for safety. First, this series of traveling scenes is determined to be learning object scenes by the determination in process S602 in FIG. 6. Next, since a movement contrary to morals, such as changing the lane into a space with a narrow inter-vehicle distance, was taken during this series of traveling actions, it is not determined by the determination in process S603 in FIG. 6 that this series of traveling actions was traveling in compliance with the rule base and the learning process in process S604 in FIG. 6 is not executed. Therefore, the traveling behavior at this time is not learned.

As described so far, by carrying out the learning process only when the traveling complies with the rule base, appropriate learning is enabled.

Figure 11:
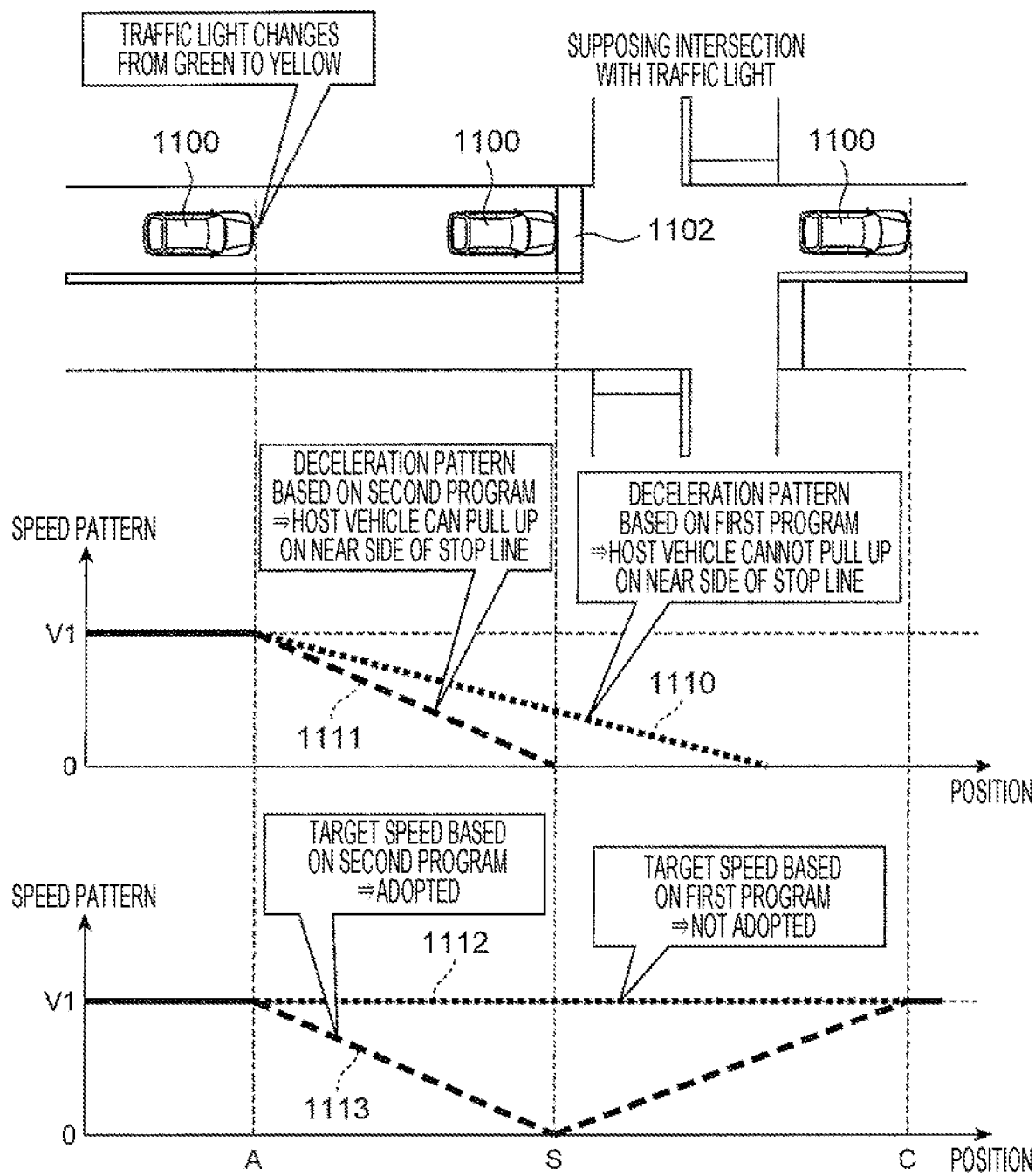
FIG. 11 is a diagram for explaining an automatic driving process.

Next, an example of the target control value generation process described in FIG. 8 will be indicated with reference to FIGS. 11 and 12.

FIG. 11 is a diagram for explaining a situation supposing a scene where a host vehicle 1100 controlled by automatic driving goes straight ahead at an intersection with a traffic light while traveling on a road with one lane each way and the upper graph illustrates a speed pattern when the host vehicle 1100 decelerates, while the lower graph illustrates the target speed of the host vehicle 1100.

When the traffic light at the intersection ahead of the host vehicle 1100 changes from green to yellow at the time of reaching a point A, the speed pattern of the host vehicle 1100 is calculated and the target speed is calculated on the basis of the calculated speed pattern. First, when a deceleration pattern based on the first program is calculated as a dotted line 1110, the host vehicle 1100 cannot pull up on the near side of a stop line 1102 and accordingly the target speed is output as a value for maintaining the speed to pass through the intersection as indicated by a dotted line 1112. Next, when a deceleration pattern based on the second program is calculated as a broken line 1111, it is judged that the host vehicle 1100 can pull up on the near side of the stop line 1102 and the target speed is output as indicated by a broken line 1113. The target speed based on the second program is an output in compliance with the rule base, which abides by the traffic rules (trying to stop when the traffic light turns yellow) and is not contrary to driving morals (stopping to an extent that does not result in a sudden braking), and this output has obtained an output of the target speed that can cause the vehicle to stop at the stop line. Therefore, the target speed based on the first program is judged to deviate from the target speed based on the second program and the target speed based on the second program is adopted.

FIG. 12 is a diagram for explaining a situation supposing a scene where a host vehicle 1200 controlled by automatic driving is merging to a main line in which traffic congestion occurs, and illustrates both of outputs of a trajectory/speed plan based on the first program and a trajectory/speed plan based on the second program.

FIG. 12(a) illustrates the output of the trajectory/speed plan based on the first program. First, when the host vehicle 1200 reaches a point A and judges that the main line ahead is congested, it is judged that merging is possible at any timing because the flow of the main line is slow and it is further judged that merging is to be performed from a farthermost point C because the lane ahead is empty. As a result, a target trajectory 1210 and a target speed 1211 are output.

FIG. 12(b) illustrates the output of the trajectory/speed plan based on the second program. First, when the host vehicle 1200 reaches the point A and judges that the main line ahead is congested, it is judged that merging is to be performed from a point B on the nearest side in accordance with the flow, although the flow of the main line is slow. As a result, a target trajectory 1220 and a target speed 1221 are output. The trajectory/speed plan based on the second program is an output in compliance with the rule base, which abides by traffic rules and is not contrary to driving morals (merging from a point on the near side in accordance with the flow), while the trajectory/speed plan based on the first program has presented an output that is contrary to morals (merging from a point on the farther side). Therefore, the trajectory/speed plan based on the first program is judged to deviate from the trajectory/speed plan based on the second program and the trajectory/speed plan based on the second program is adopted.

However, the above-mentioned driving morals may differ depending on the countries and regions to which they apply, such that the trajectory/speed plan based on the second program is not always adopted.

As described so far, when the target control value based on the first program is compared with the target control value based on the second program and the target control value based on the first program deviates from the target control value based on the second program, the target control value based on the second program is adopted. Therefore, an output in compliance with the rule base is finally selected.

Second Embodiment

Next, a second embodiment of the present invention will be described with reference to FIGS. 13 and 14.

Figure 13:
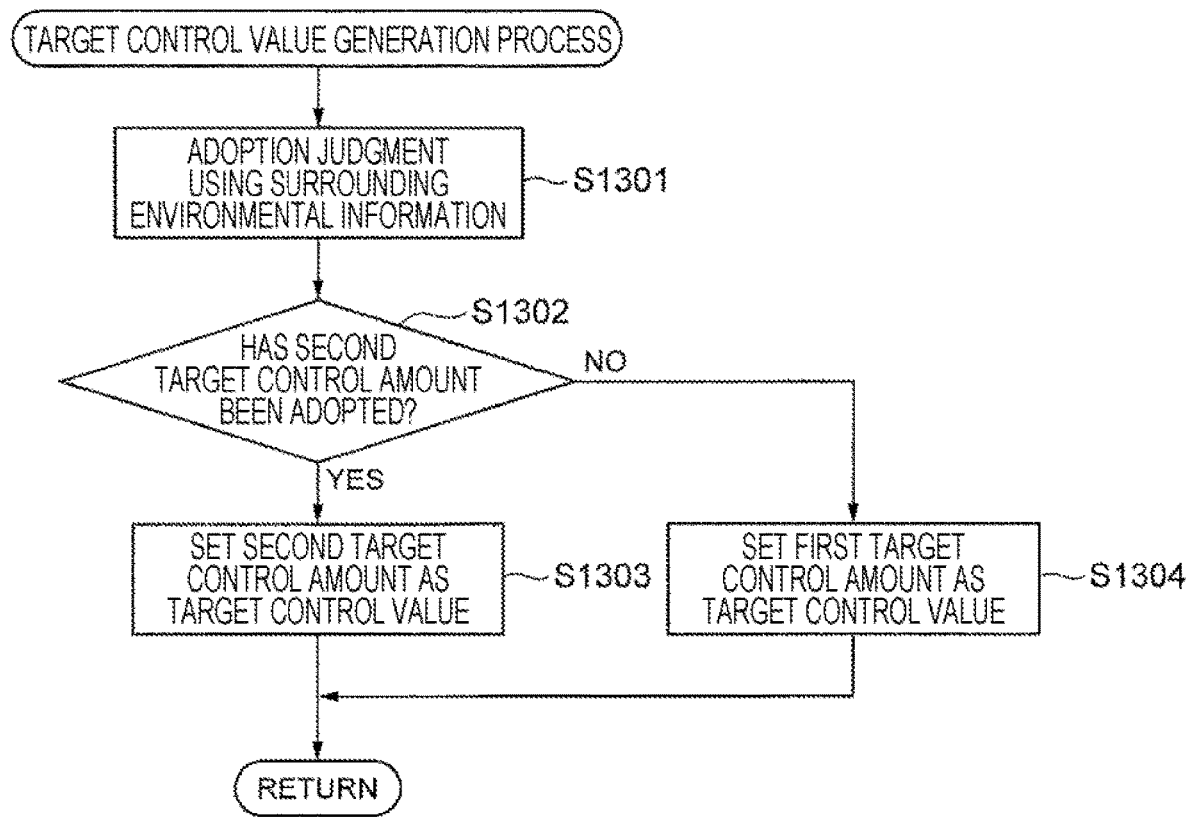
FIG. 13 is a flowchart for explaining the operation of a vehicle control device according to a second embodiment of the present invention.

The second embodiment of the present invention is obtained by replacing the target control value generation process illustrated in FIG. 8 in the first embodiment of the present invention with a process illustrated in FIG. 13.

FIG. 13 is a flowchart illustrating an example of a processing procedure of the target control value generation process in process S703 in FIG. 7.

In process S1301 in FIG. 13, judgment is carried out on which one of the first target control amount generated in process S701 and the second target control amount generated in process S702 is selected, using the surrounding environmental information, and the procedure proceeds to process S1302.

In process S1302, it is determined whether the second target control amount has been adopted in process S1301. When it is determined that the second target control amount has been adopted, the procedure proceeds to process S1303 and the second target control amount is set as the target control value in process S1303; then, the series of processes is terminated. On the other hand, when it is not determined in process S1302 that the second target control amount has been adopted, the procedure proceeds to process S1304 and the first target control amount is set as he target control value in process S1304; then, the series of processes is terminated.

FIG. 14 is a diagram illustrating an example of which one of the first target control amount and the second target control amount is selected in FIG. 13.

FIG. 14(a) illustrates an example of adopting the first target control amount. When a host vehicle 1410 changes the lane to the right, since no obstacles that block the host vehicle from traveling are present nearby, there is no concern in traveling in accordance with the driver's preference, which is the first target control amount.

FIG. 14(b) illustrates an example of adopting the second target control amount. When the host vehicle 1410 changes the lane to the right, since obstacles that block the host vehicle from traveling are present nearby, there is no concern in traveling on the basis of traffic rules and driving morals, which is the second target control amount.

As described so far, by using the method of selecting the first target control amount and the second target control amount depending on the environment around the host vehicle, traveling in compliance with the rule base is enabled as a result.

Third Embodiment

Next, a third embodiment of the present invention will be described with reference to FIGS. 15 and 16.

Figure 15:
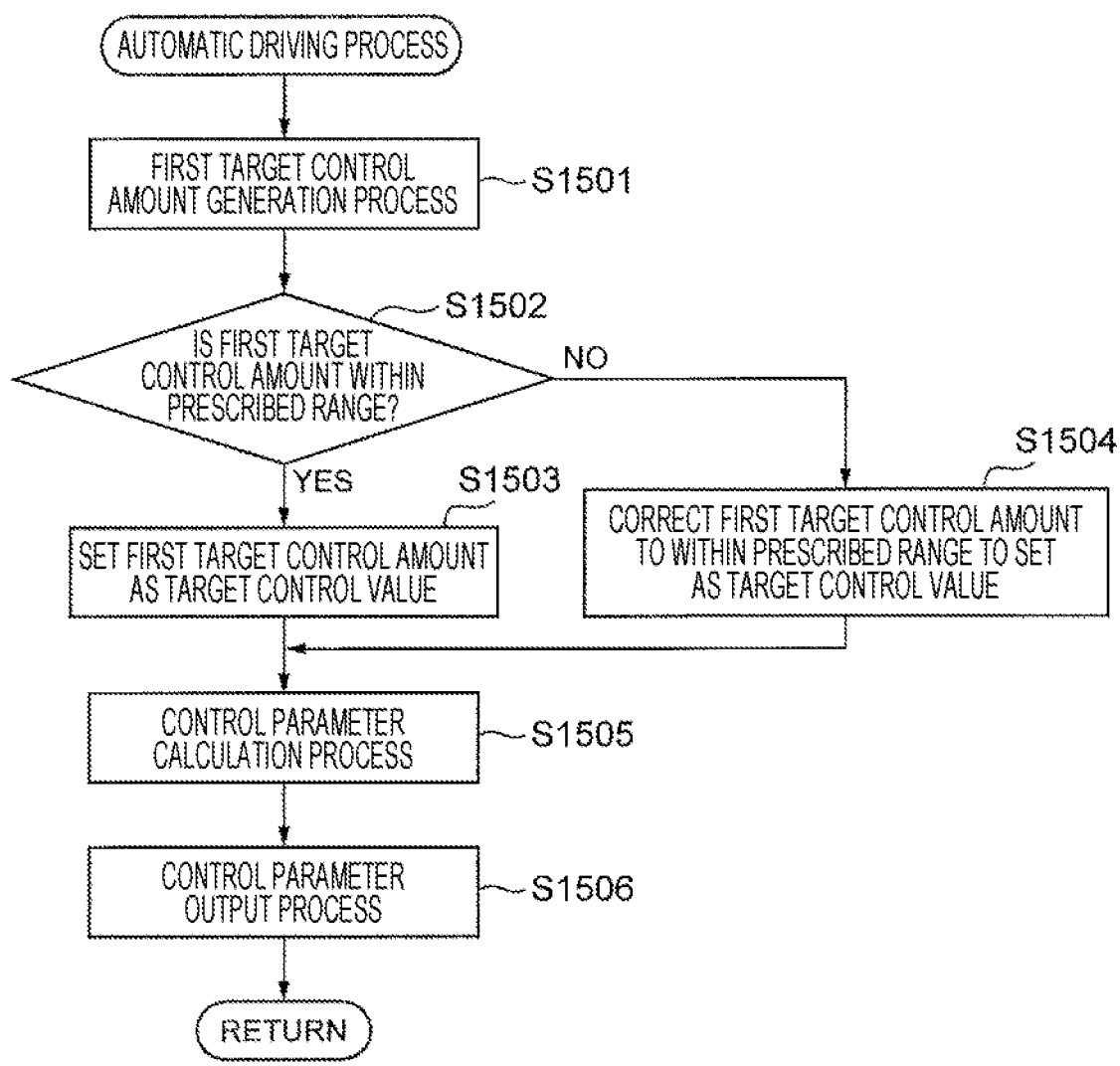
FIG. 15 is a flowchart for explaining the operation of a vehicle control device according to a third embodiment of the present invention.

The third embodiment of the present invention is obtained by replacing the automatic driving process illustrated in FIG. 7 in the first embodiment of the present invention with a process illustrated in FIG. 15.

FIG. 15 is a flowchart illustrating an example of a processing procedure of the automatic driving process in process S505 in FIG. 5.

In process S1501 in FIG. 15, the target control amount is generated by the first program and the procedure proceeds to process S1502. In this example, the target trajectory and the target speed of the host vehicle are generated according to a trajectory/speed plan updated by the learning process described in FIG. 6.

In process S1502, it is determined whether the first target control amount is within a prescribed range. When it is determined that the first target control amount is within the prescribed range, the procedure proceeds to process S1503 and the first target control amount is set as the target control value in process S1503; then, the procedure proceeds to process S1505. On the other hand, when it is determined in process S1502 that the first target control amount is not within the prescribed range, the procedure proceeds to process S1504. The first target control amount is corrected to fall within the prescribed range and set as the target control value in process S1504; then, the procedure proceeds to process S1505.

Since processes S1505 and 51506 are the same as processes S704 and S705 described in FIG. 7, the description will be omitted.

Figure 16:
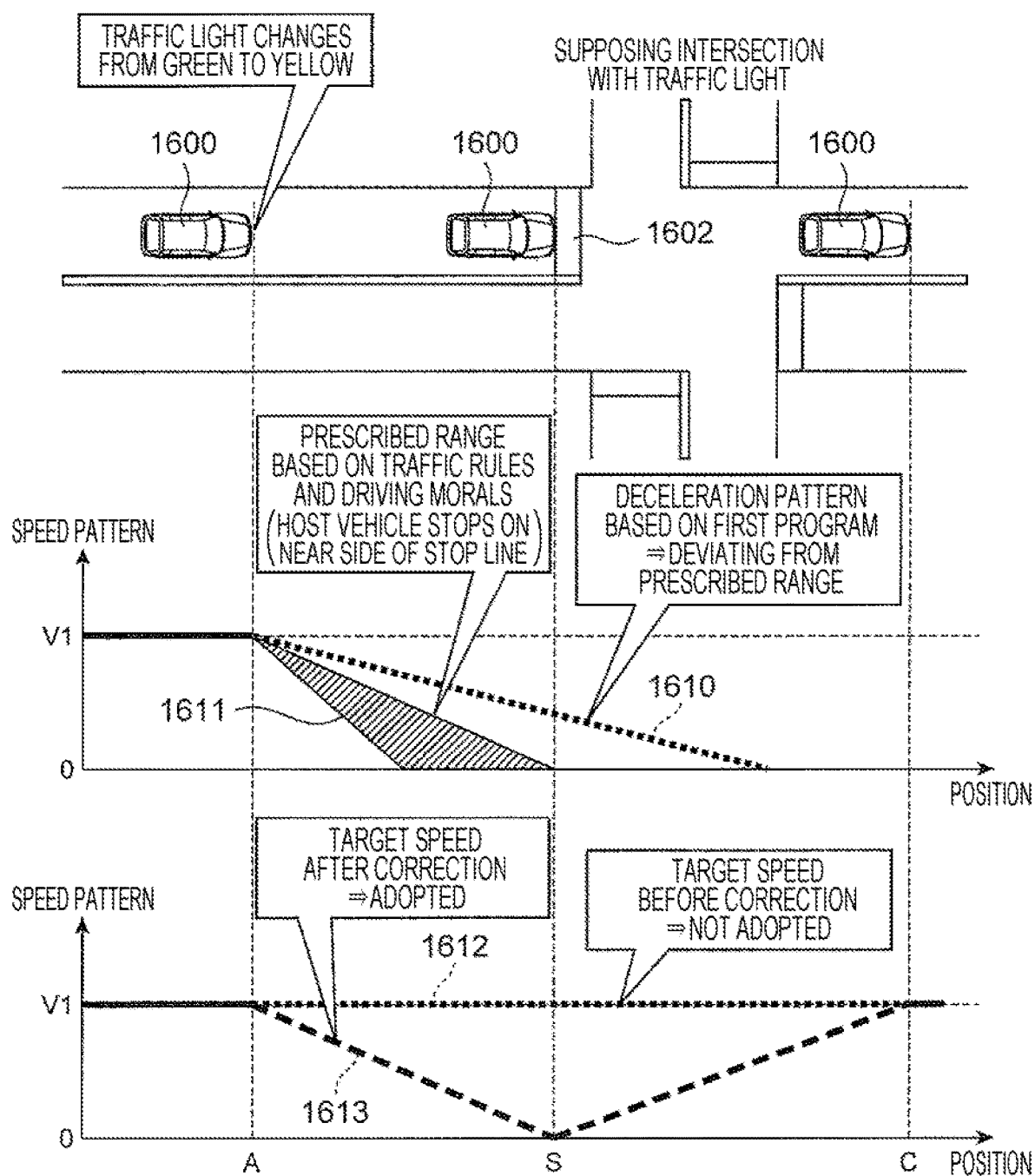
FIG. 16 is a diagram for explaining an automatic driving process.

Similarly to FIG. 11, FIG. 16 is a diagram for explaining a situation supposing a scene where a host vehicle 1600 controlled by automatic driving goes straight ahead at an intersection with a traffic light while traveling on a road with one lane each way and the upper graph illustrates a speed pattern when the host vehicle 1600 decelerates, while the lower graph illustrates the target speed of the host vehicle 1600.

When the traffic light at the intersection ahead of the host vehicle 1600 changes from green to yellow at the time of reaching a point A, the speed pattern of the host vehicle 1600 is calculated and the target speed is calculated on the basis of the calculated speed pattern. First, when a deceleration pattern based on the first program is calculated as a dotted line 1610, the host vehicle 1600 cannot pull up on the near side of a stop line 1602 and accordingly the target speed is output as a value for maintaining the speed to pass through the intersection as indicated by a dotted line 1612. Next, when the prescribed range based on traffic rules and driving morals is computed, the range of a region 1611 is output and accordingly it is judged that the host vehicle 1600 can pull up on the near side of the stop line 1602 by selecting this range. Then, when the target speed is corrected within the range of the region 1611, the corrected target speed is given as indicated by a broken line 1613 and this target speed is adopted.

As described so far, also using the method of correcting the first control amount to the prescribed range, traveling in compliance with the rule base is finally enabled.

Fourth Embodiment

Next, a fourth embodiment of the present invention will be described with reference to FIGS. 17, 18 and 19.

The fourth embodiment of the present invention has a configuration obtained by changing the function equivalent to the first program in the configuration illustrated in FIGS. 2 and 3 in the first embodiment of the present invention.

Figure 17:
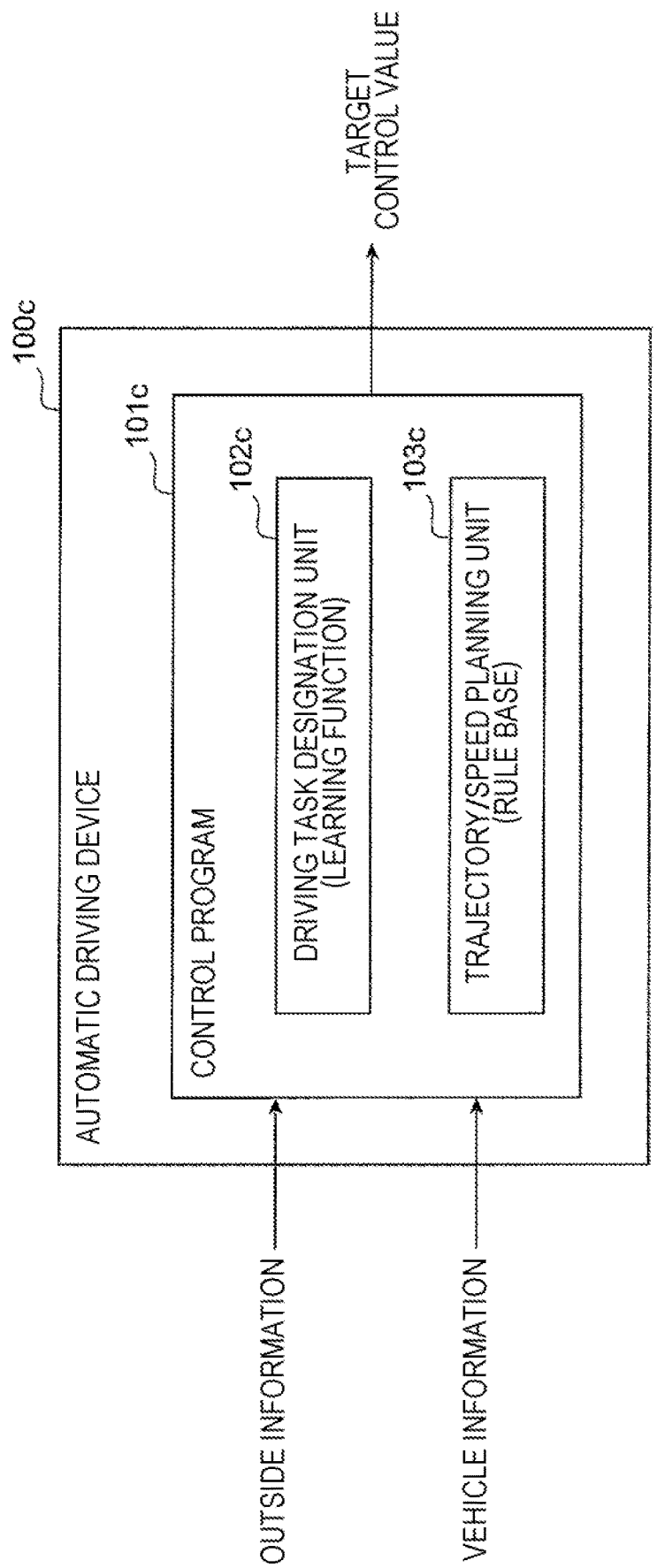
FIG. 17 is a schematic configuration diagram of an automatic driving device according to a fourth embodiment of the present invention.
Figure 18:
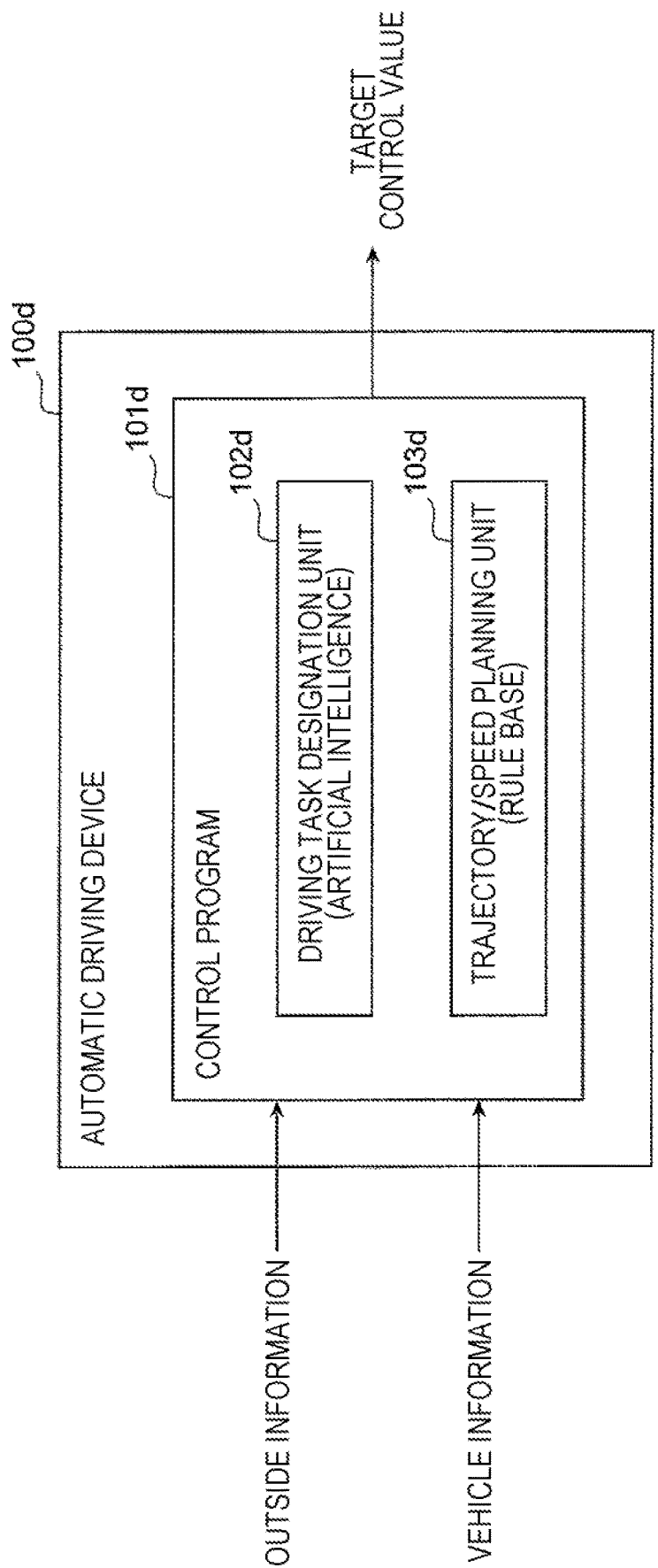
FIG. 18 is a schematic configuration diagram of the automatic driving device according to the fourth embodiment of the present invention.

FIGS. 17 and 18 are schematic configuration diagrams of an automatic driving device according to the fourth embodiment of the present invention.

A driving task designation unit (learning function) 102c in FIG. 17 is a first program for designating a movement (driving task) of the host vehicle at a manner level using the learning function and uses the outside information (environmental information, road information, and the like around the host vehicle) and the vehicle information (vehicle speed, steering angle, yaw rate, and the like) as inputs to output a driving task.

A driving task designation unit (artificial intelligence) 102d in FIG. 18 is a first program for designating a movement (driving task) of the host vehicle at a manner level using artificial intelligence and uses the outside information (environmental information, road information, and the like around the host vehicle) and the vehicle information (vehicle speed, steering angle, yaw rate, and the like) as inputs to output a driving task.

The driving task here represents the driving state of the host vehicle, such as preceding vehicle following, lane tracking, lane change, going straight ahead/right turn/left turn at intersection, and parking, and is a control state serving as a guide for movement for trajectory/speed planning units in FIGS. 17 and 18.

Figure 19:
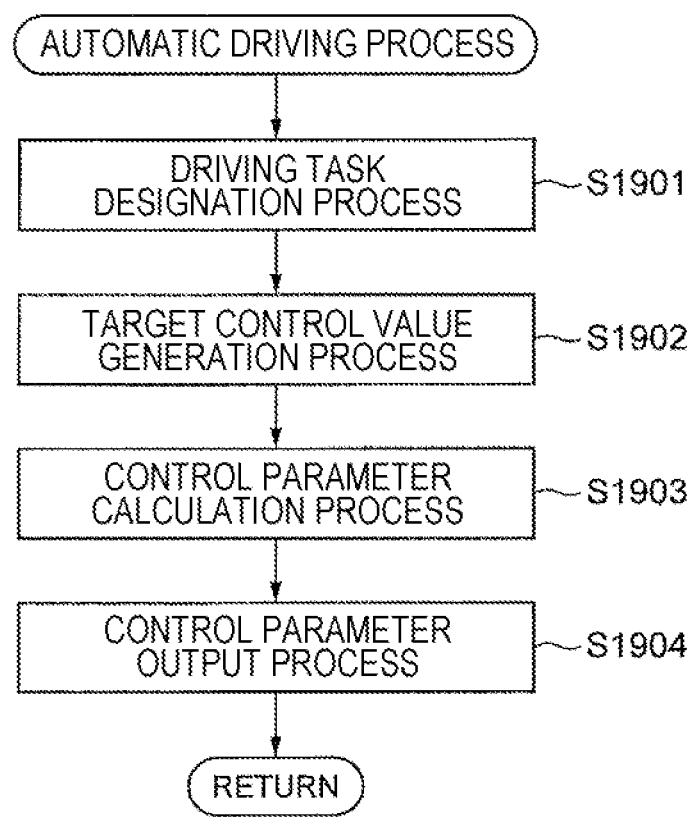
FIG. 19 is a flowchart for explaining the operation of a vehicle control device according to the fourth embodiment of the present invention.

FIG. 19 is a flowchart illustrating an example of a processing procedure of the automatic driving process in process S505 in FIG. 5.

In process S1901 in FIG. 19, the driving task is designated on the basis of the first program (the control state is determined) and the procedure proceeds to process S1902.

In process S1902, a target control value is generated on the basis of the second program and the procedure proceeds to process S1903.

Since processes S1903 and 51904 are the same as processes S704 and S705 described in FIG. 7, the description will be omitted.

As explained so far, the movement (driving task) of the host vehicle at the manner level is designated by the first program and the trajectory/speed plan as the target control value is generated by the second program based on the rule base, whereby traveling in compliance with the rule base is enabled.

Note that the above description is merely an example and, in interpreting the invention, there is no limitation or restriction on the correspondence relationship between the description items of the above embodiments and the description items of the claims. For example, in the above-described embodiments, a passenger car is supposed as the host vehicle, but the present invention is also applicable to automatic traveling of a construction machine, a robot, or the like.

While the embodiments of the present invention have been described so far in detail, the present invention is not limited to the above-described embodiments and various design changes can be made without departing from the spirit of the present invention described in the claims. For example, the aforementioned embodiments have been described in detail in order to make the description of the invention easy to understand. Therefore, the embodiments are not necessarily limited to the ones provided with the whole configurations that have been described. In addition, part of the configuration of a certain embodiment can be replaced with the configuration of another embodiment, while it is also possible to add the configuration of a certain embodiment to the configuration of another embodiment. Part of the configuration of each of the embodiments can be subjected to addition, deletion, and replacement of another configuration.

REFERENCE SIGNS LIST

100 automatic driving device
101, 101a control program
102 first program
102a trajectory/speed planning unit (learning function)
102b trajectory/speed planning unit (artificial intelligence)
102c driving task designation unit (learning function)
102d driving task designation unit (artificial intelligence)
103 second program
103a, 103b, 103c, 103d trajectory/speed planning unit (rule base)

The invention claimed is:

1. An automatic driving device comprising:
   a processor that is configured to
      input outside information and vehicle information, and outputting a target control value for a vehicle,
      generate a first target control amount on the basis of a dynamically changing algorithm; and
      generate a second target control amount on the basis of a prescribed algorithm, wherein
         the target control value is generated on the basis of the first target control amount and the second target control amount,
         the dynamically changing algorithm is a processing technique for generating a target control amount on the basis of at least artificial intelligence or a learning function, and
         the learning function learns a traveling behavior when a driver causes the vehicle to travel and, when the driver at least violates traffic rules or is contrary to driving morals during traveling, a traveling behavior at this time is not learned.

2. The automatic driving device according to claim 1, wherein the prescribed algorithm is a processing technique for generating a target control amount on the basis of at least traffic rules and driving morals.

3. The automatic driving device according to claim 1, wherein, when the first target control amount deviates from a range of the second target control amount, the second target control amount is assigned as the target control value.

4. The automatic driving device according to claim 1, wherein judgment on which control amount of the first and second target control amounts is to be assigned as the target control value is made on the basis of the outside information.

5. The automatic driving device according to claim 1, wherein the target control value is a set of a target trajectory and a target speed of the vehicle, or a target control amount for each actuator.

* * * * *